United States Patent [19]

Lenchik

[11] Patent Number: 5,552,806
[45] Date of Patent: Sep. 3, 1996

[54] METHOD AND APPARATUS FOR POSITIONING SELECTABLE FUNCTION ICONS ON A DISPLAY

[75] Inventor: Vitaly Lenchik, Lake Zurich, Ill.

[73] Assignee: Motorola, Inc., Schaumburg, Ill.

[21] Appl. No.: 235,756

[22] Filed: Apr. 29, 1994

[51] Int. Cl.$^6$ .................................................. G09G 5/00
[52] U.S. Cl. ...................... 345/156; 345/146; 345/173
[58] Field of Search .................................. 345/157, 158, 345/156, 131, 169, 173; 340/572, 825.54, 825.65, 825.36, 825.44–825.51; 364/401, 419; 348/734; 455/38.1–38.9; 341/23; 395/600

[56] References Cited

U.S. PATENT DOCUMENTS

| | | | |
|---|---|---|---|
| 4,688,026 | 8/1987 | Scribner | 340/572 |
| 4,746,919 | 5/1988 | Reitmeir | 341/23 |
| 4,837,568 | 6/1989 | Snaper | 340/825.54 |
| 4,916,441 | 4/1990 | Gombrich | 345/169 |
| 4,959,721 | 9/1990 | Micic et al. | 345/158 |
| 5,032,989 | 7/1991 | Tornetta | 345/131 |
| 5,038,401 | 8/1991 | Inotsume | 341/23 |
| 5,041,967 | 8/1991 | Ephrath | 395/600 |
| 5,086,394 | 2/1992 | Shapira | 364/419 |
| 5,185,604 | 2/1993 | Nepple et al. | 340/825.44 |
| 5,204,670 | 4/1993 | Stinton | 340/825.54 |
| 5,250,941 | 10/1993 | McGregor et al. | 340/825.65 |
| 5,285,493 | 2/1994 | Wagai et al. | 345/156 |
| 5,287,266 | 2/1994 | Malec et al. | 364/401 |
| 5,319,363 | 6/1994 | Welch et al. | 340/825.36 |

*Primary Examiner*—Steven Saras
*Attorney, Agent, or Firm*—Daniel C. Crilly

[57] ABSTRACT

Functions, represented by icons, likely to be used by a user may be depicted on a display (102) such that the user may invoke functions in a user friendly manner. Target function icons to be depicted on the display are determined from a pool of available functions based on an operating environment locale of a device (100) comprising the display (102). The target function icons are then presented on the display (102) such that the user can select or invoke a function represented by the function icon. In this manner, the user may invoke frequently used functions with less user input.

7 Claims, 3 Drawing Sheets

5,552,806

METHOD AND APPARATUS FOR POSITIONING SELECTABLE FUNCTION ICONS ON A DISPLAY

FIELD OF THE INVENTION

This invention relates generally to user interfaces and, in particular, to positioning selectable function icons on a display.

BACKGROUND OF THE INVENTION

Currently, handheld devices exist that control various electronic devices. For example, there are remote control units to control a television set (TV), a video cassette recorder (VCR), or a compact disc (CD) player, to name just a few. There are individual remote control units to control these devices individually and there are universal remote control units that allow several devices such as the TV, VCR, and CD player to all be controlled by one remote control unit.

As technology advances, electronic devices are decreasing in size, which allows several devices to fit into one portable device. For example, a portable device may contain both a TV set and a VCR, or a portable device may contain a dual audio cassette tape player/recorder, a radio, and a CD player. These devices typically have several keys or buttons each having a single dedicated function for one operating part of the device. For instance, a button that controls the playing of a CD in the CD player portion of the device would not also control the playing of an audio cassette tape in one or both of the dual audio cassette tape player/recorder.

Currently, many features of today's portable devices are difficult to access because growing complexity results in increased number of key strokes being required to execute any given function. These key strokes often have no obvious relationship to the intended function. At the same time, as physical dimensions of portable devices decreases, the number of control keys used to operate them also decreases. For example, to display an individual call timer within a typical prior art portable telephone requires the following three key entries in sequence: "RCL", "#", and "#". To display a resettable timer within the same portable telephone requires four key entries in sequence, namely: "RCL", "#", "#", and "#". Since these two functions and their respective key entries are very similar, it would be very easy for the user to confuse the two functions.

Typically each device requires a separate user interface which is often cryptic and user unfriendly. As technology advances, rendering devices more affordable, users begin to own more and more of these small user-unfriendly devices. Thus, integrated devices are created to reduce clutter and improve the user interface. Nevertheless, as the number of integrated tasks within a single device grows due to advances in technology and manufacturing, it will become increasingly difficult for a user to execute a given function due to an increase in the number of key strokes required.

Accordingly, there is a need for an apparatus and a method of providing a selection of tasks and/or functions on a display that integrate a large number of tasks within a single portable device and provides easy navigation within the tasks.

DESCRIPTION OF A PREFERRED EMBODIMENT

Generally, the following description provides an apparatus and a method of providing a selection of task and/or function icons on a display based on an operating environment locale and historical records of previously selected functions and tasks within the operating environment locale. This is accomplished by providing a device, containing a display, that is able to determine its locale via a received transmitted signal designating the locale. For example, a first transmitter sending one digital code may be used to indicate a home locale, while a second transmitter sending another code may indicate a work locale. A third possibility, i.e., no transmitted code, may indicate a mobile locale. Within each locale, certain tasks are more probable than others, and consequently the representations of these more probable tasks (icons) are selected for presentation on the display. Positioning of the icons on the display is also determined by the locale. For instance, a probable task while at work might be to call an associate's telephone number, whereas a probable task while at home might be to turn on a television set. Each probable task or function might appear in a preferred part of the display based on the locale. With such a device and method, selectable function and/or task icons, based on both the present operating environment locale and previously selected function and task icons, can be positioned on the display providing a more user friendly interface to a user.

Figure 1:
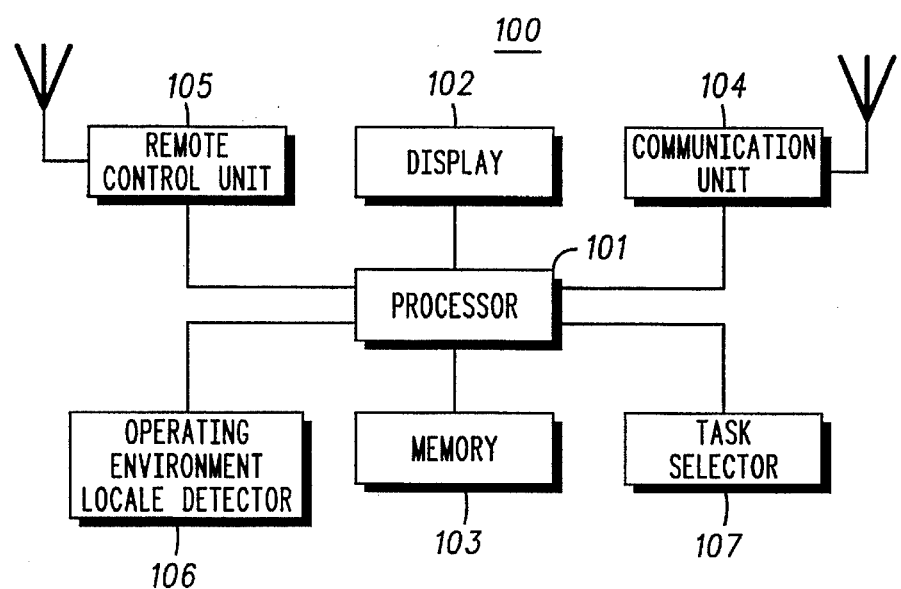
FIG. 1 illustrates a block diagram of a communications device in accordance with the present invention.

The present invention can be more fully described with reference to FIGS. 1–7. FIG. 1 illustrates a device (100) in accordance with the present invention that includes a function processor (101), such as, a processor from a Motorola 68000 family, a display (102), such as, a color active matrix liquid crystal display, memory (103), such as, random access memory (RAM), a two-way communication unit (104), such as, a cellular telephone transceiver, a remote control unit (105), such as, an infrared transmitter used for sending codes to audio/visual electronic equipment, an operating environment locale detector (106), such as, a radio receiver and decoder, and a task selector (107), such as, a touch screen or soft key panel. The above noted components are each individually well known and understood in the art, and hence will not be described here in more detail, except where appropriate to an understanding of the invention.

Figure 2:
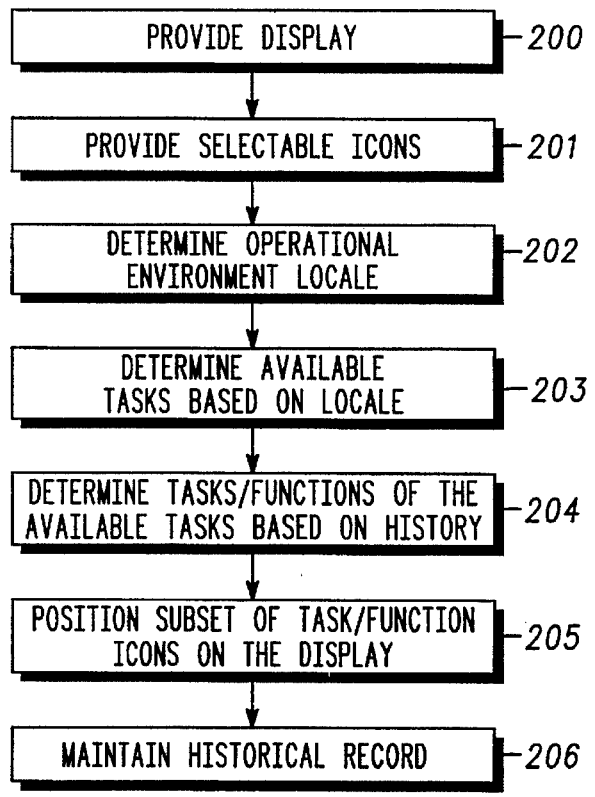
FIG. 2 illustrates a logic diagram in accordance with the present invention.

FIG. 2 illustrates a logic diagram. At step 200, a display (such as the display (102) noted above) is provided to display selectable task and/or function icons to the user. A number of selectable function icons each corresponding to a function is provided (201) in the memory (103) as available icons to be presented on the display. User control of the device (100) is provided through the task selector (107), such as, a touch screen with underlying icons. Icons are either representations of tasks, such as "TV remote control", or functions, such as "channel up" or "mute". It is likely that some tasks will contain other tasks or functions, for example, a "control" task may contain a "TV remote control" task and a "house lights control" task. In addition, some tasks/functions may contain arguments, for example, a "document viewer" task may contain a function called "open document". A "document name" argument may be supplied to the "open document" function via a scrolling list of available documents. An icon itself may be of various forms known in the industry, such as, graphic only, text and graphic, text only, animated graphic, and so forth. An icon may be automatically generated, for example, an icon of the particular document may be a reduced image of the graphic within the document (this is generally called a picon). In either case, an icon is designed as a short hand or a visually intuitive notation to represent a specific action that a user can select to execute. To provide an effective user interface, each task and function has a corresponding icon or set of corresponding icons for display on the screen.

The next step (202) determines an operating environment locale of the device. The operating environment locale may be home, office, car, or any other environment where a customized user interface is desirable. In order to enable the device to recognize its present locale, various techniques could be used. For example, a device may require an accompanying digital radio beacon to be placed in the vicinity of the particular locale. A digital signature of the device could be selectable by the user at the time of deployment. When the device comes within proximity of the beacon, the operating environment locale detector (106) determines the locale based on the beacon. In the absence of the beacon, the operating locale detector determines the locale to be a mobile locale. A system of this type has been previously deployed by Motorola for bus stop identifications (Metrocom). Alternatively, a surface acoustic wave (SAW) resonator may be used to indicate a particular locale. In this manner, the device may emit a probing signal which, when reflected from the SAW resonator, produces a specific signature distinguishing one locale from another. The above represents examples of locale detectors well known in the industry, thus no further discussion will be presented.

In step (203) selectable tasks/functions of the device (100) are determined based on the present locale. Tasks/functions which are not appropriate for the present locale are ineligible for selection. For example, at home the device can be used to control a television set and house lights, whereas, at work this same control may be meaningless if neither a TV set nor house lights controller is present at the work locale. There may be tasks/functions which operate at multiple locales, i.e., home, work, and in a car, such as, a telephone task. These tasks may share the user interface even if underlying communications are accomplished via different means. For instance, at home and at work a cordless telephone mode may be invoked. In the car, the cordless telephone mode may not be invoked whereas a cellular telephone mode may be invoked. If there are any differences in the user interface due to these methods, such as, caller ID, the icon representing caller ID will be displayed if it is an allowed function or hidden if it is not an allowed function.

Of the tasks/functions that are eligible for selection based on the locale, the device, via the task selector, determines those tasks/functions that will likely be needed by the user based on a historical record (204). To support this, whenever a specific task or function is selected and executed by the user, the device maintains a historical record in the memory (206). The record may contain such items as:

a) task/function:
b) locale:
c) depth of function within hierarchical structure of tasks/functions;
d) previously executed step;
e) time of day:
f) date; and
g) day of the week.

These key sequences are analyzed for patterns and a metric is defined to identify which functions or tasks will have the most likely effect of reducing key strokes by the user on his next action. Based on this metric, the icons are prioritized and the top few on the list are displayed based on the available area on the display, number of soft keys, and the like (205). The most simple strategy may be a first-in-first-out-strategy, which allows the user to return to the most recently executed task, regardless of how far down it is in the task hierarchy. However, more elaborate strategies are possible, such as, automatically placing an icon on the display to call a specific person, if it happens to be the one person that the user calls periodically from work or from his car during the course of the day.

This context based task selector can be presented to the user concurrently with a hierarchical selector, which allows viewing of all of the tasks in a hierarchical manner regardless of whether these tasks are likely to be needed or not. This provision is important in some applications because an unlikely key sequence may be needed by the user since it is impossible to guess with one hundred percent accuracy what the next action will be by the user. One example, may be that the user may want to make a cellular not a cordless telephone call from his office.

Positioning of the icons on the display may be in a pattern corresponding to the software definable keys along the bottom, top, or sides of the display. They may also be positioned in an irregular pattern as long as a positive association exists between a selecting key and the icon. Irregularly positioned icons may be selected using a touch/pen input, through scrolling, or cursor selection.

Figure 3:
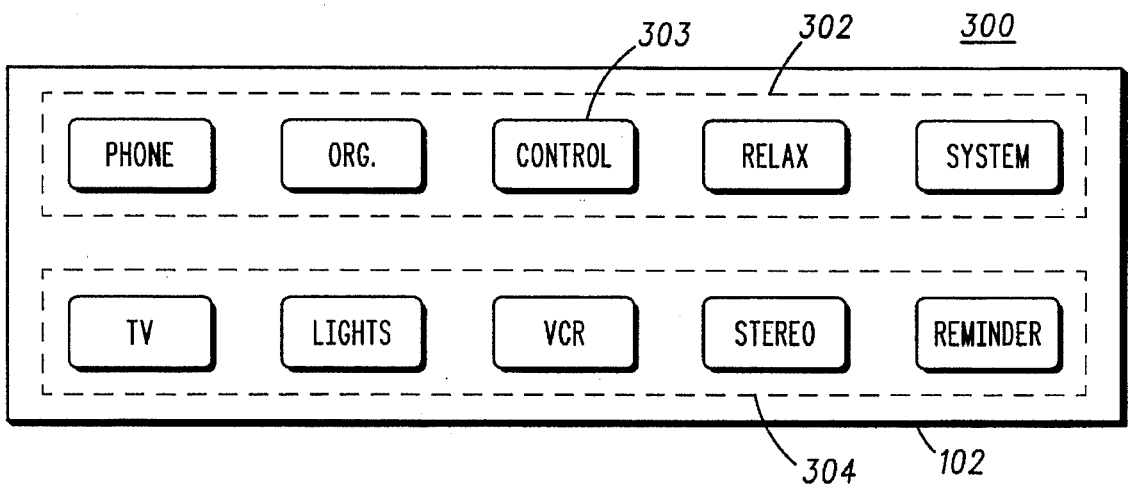
FIG. 3 illustrates an arrangement of task and/or function icons on a display in accordance with the present invention.

FIGS. 3–7 depict various arrangements of task and/or function icons on the display (102) in accordance with the present invention. FIG. 3 depicts how icons might be positioned on the display (102) when the device (100) is in the operating environment locale of the user's home. In a preferred embodiment, the top row (302) of icons on the display (102) represent the highest level of tasks available to the user in the home operating environment locale, i.e., hierarchical (such as, for example, a "control" icon (303)), while the bottom row (304) of icons represent tasks and functions based on a historical record of user selectable functions that the user typically uses while at home, i.e., contextual.

Figure 4:
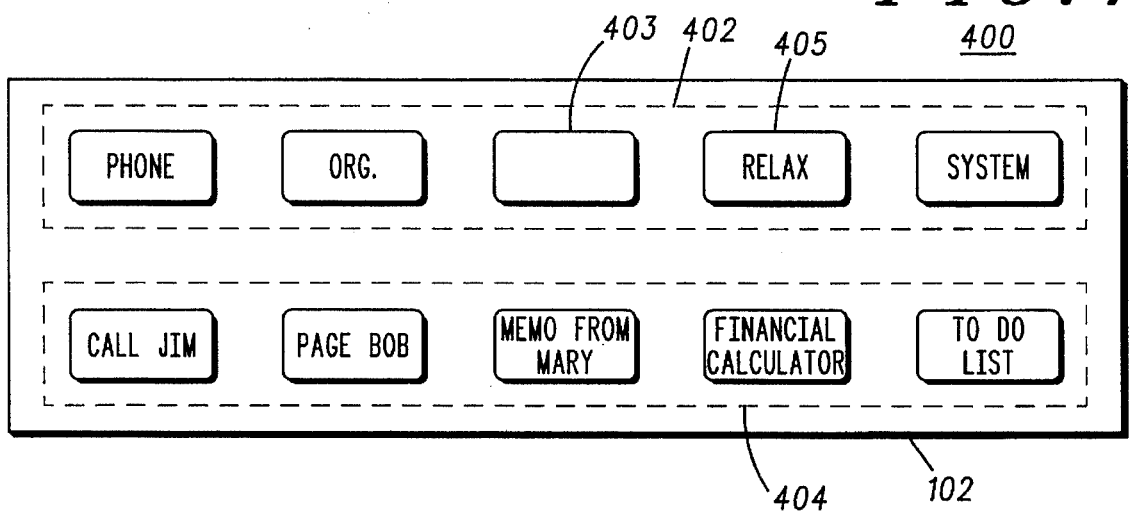
FIG. 4 illustrates an alternative arrangement of task and/or function icons on the display in accordance with the present invention.

If the device (100) is moved from home to work, the display (102) would change (400) as shown in FIG. 4. This may affect both hierarchical (402) and contextual (404) rows of selectable icons. If control applications (e.g., control of a television or lights) do not exist at work, the control icon (303) may dim (403) or be completely deleted as a selectable icon at the work locale. The contextual row may also change. In this example, the contextual row (304) at home may contain TV, Lights, VCR, Stereo, and Reminder icons because these are tasks/functions that the user typically uses at home. At work the contextual row (404) may change to display icons of Call Jim, Page Bob, view Memo from Mary, display Financial calculator, and view a To Do list (these being illustrative examples of tasks and functions that the user might ordinarily exercise in his or her work environment).

Figure 5:
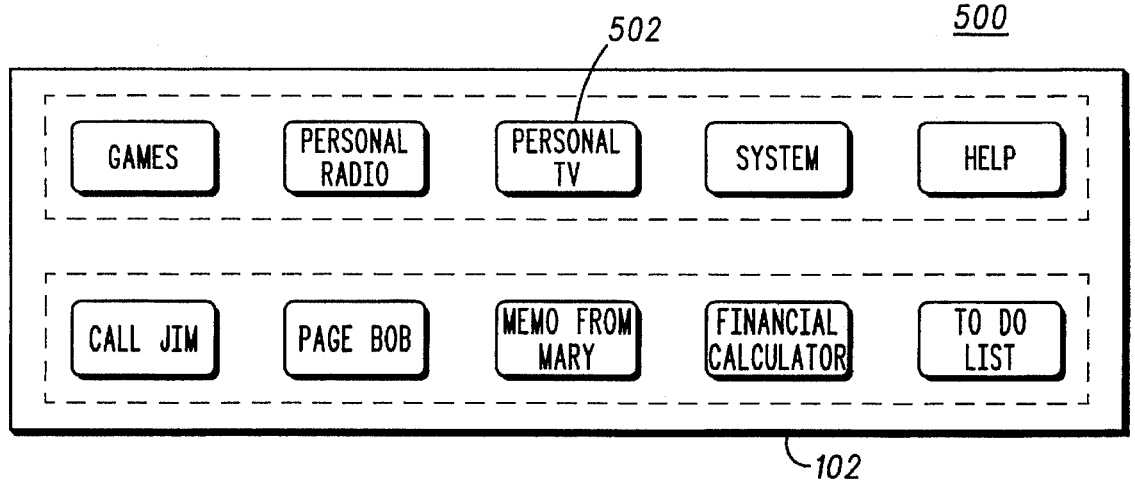
FIG. 5 illustrates an alternative arrangement of task and/or function icons on the display in accordance with the present invention.
Figure 6:
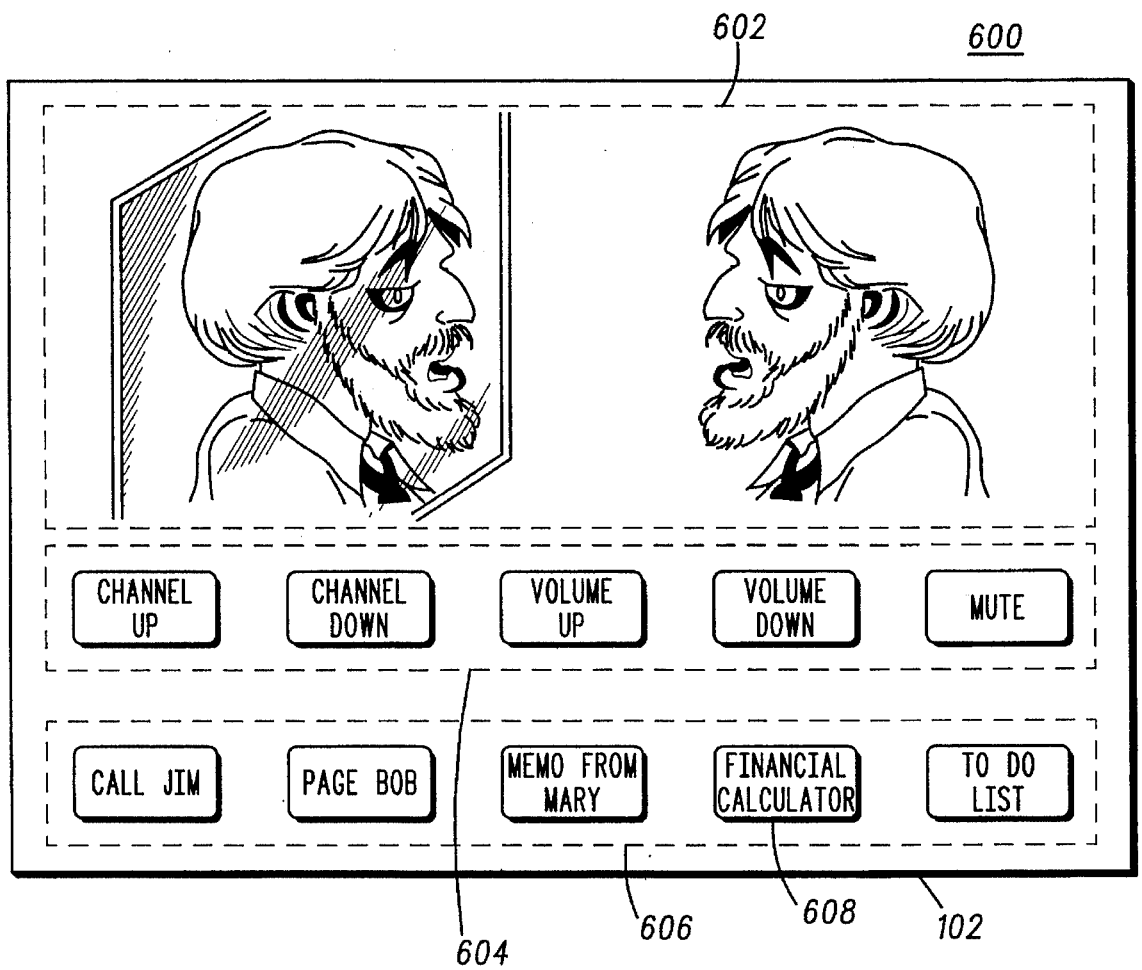
FIG. 6 illustrates an alternative arrangement of task and/or function icons on the display in accordance with the present invention.
Figure 7:
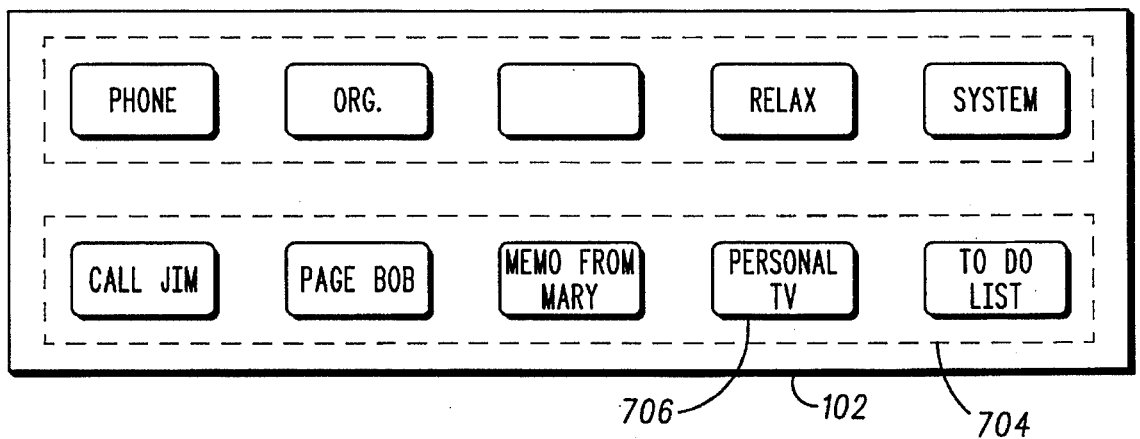
FIG. 7 illustrates an alternative arrangement of task and/or function icons on the display in accordance with the present invention.

As an example of usage, selecting Relax (405) from the hierarchical row of selectable icons (402) changes the display to that shown in FIG. 5. Selecting personal TV (502) then changes the display to that shown in FIG. 6. In the background an actual television image (602) is received and displayed. In the foreground, the selectable row of icons (604) shows functions associated with controlling the personal TV, such as, channel up and channel down. At the same time, the contextual row (606) continues to display tasks that the user may want to perform while watching TV. However, as shown in FIG. 7, if the user watches TV often while at the work locale, the personal TV icon (706) will displace one of the other less accessed tasks such as, Financial Calculator (608) in the contextual selector (704).

The above teachings provide a method and an apparatus of providing a selection of task and/or function icons on a display based on an operating environment locale and historical records of previously selected functions and tasks in the operating environment locale. By providing such a method and apparatus, it is possible to integrate a large number of necessary tasks within a single portable device and easily navigate within those tasks.

By utilizing the present invention, selectable function and/or task icons associated with the operating environment locale and previously selected function and task icons can be provided on the display to a user to produce a more user friendly interface.

I claim:

1. In a communications device having a display, a method for operating the communications device, the method comprising the steps of:

determining, by the communications device, a geographic operating locale of the communications device;

when the communications device is in a first geographic operating locale, automatically positioning at least a first icon on the display, the at least a first icon corresponding to at least one selectable function of the communications device that can be performed in the first geographic operating locale;

when the communications device is in a second geographic operating locale, automatically positioning at least a second icon on the display, the at least a second icon corresponding to at least one selectable function of the communications device that can be performed in the second geographic operating locale, wherein the second geographic operating local is distinct from the first geographic operating locale and the at least one selectable function corresponding to the at least a first icon is distinct from the least one selectable function corresponding to the at least a second icon;

upon selection of an icon by a user of the communications device, performing a selectable function corresponding to the selected icon; and maintaining a historical record of selectable functions that have been selected by a user at each geographic operating locale.

2. The method of claim 1, wherein the step of automatically positioning the at least a first icon on the display includes the step of automatically positioning a first plurality of icons on the display, which first plurality of icons each correspond to a selectable function of the communications device that can be performed in the first geographic operating locale and wherein the step of automatically positioning the at least a second icon on the display includes the step of automatically positioning a second plurality of icons on the display which second plurality of icons each correspond to a selectable function of the communications device that can be performed in the second geographic operating locale.

3. The method of claim 1, wherein the step of automatically positioning the at least a first icon on the display includes the step of automatically positioning the at least a first icon on the display as a function of the historical record of selectable functions selected at the first geographic operating locale.

4. A device, comprising:

a display;

an operating environment locale detector that determines a geographic operating locale of the device;

a memory containing a plurality of function selection icons that correspond to a plurality of functions capable of being performed by the device and a stored historical record of functions that have been selected at a first geographic operating locale and a second geographic operating locale by a user of the device: and a function processor, operably coupled to the display, the memory, and the operating environment locale detector, that selects at least a first function selection icon of the plurality of function selection icons for presentation on the display as a function of the stored historical record of functions selected at the first geographic operating locale when the device is within the first geographic operating locale, that selects at least a second function selection icon of the plurality of function selection icons for presentation on the display when the device is within a second geographic operating locale, the second geographic operating locale being distinct from the first geographic operating locale and at least one function corresponding to the at least a first function selection icon being distinct from at least one function corresponding to the at least a second function selection icon, and that instructs the device to perform a particular function corresponding to a function selection icon selected by a user of the device.

5. In a communications device having a display, a method for operating the communications device, the method comprising the steps of:

determining, by the communications device, a geographic operating locale of the communications device:

determining a user selectable function presently selected by a user of the communications device to produce a presently selected function, which user selectable function has a corresponding selectable function icon;

maintaining a historical record of user selectable functions that have been selected by a user:

when the communications device is in a first geographic operating locale, automatically positioning a first plurality of selectable function icons on the display as a function of the historical record and the presently selected function, the first plurality of selectable function icons corresponding to a first plurality of user selectable functions of the communications device that can be performed in the first geographic operating locale:

when the communications device is in a second geographic operating locale, automatically positioning a second plurality of selectable function icons on the display as a function of the historical record, the second plurality of selectable function icons corresponding to a second plurality of user selectable functions of the communications device that can be performed in the second geographic operating locale, wherein the second geographic operating local is distinct from the first geographic operating locale and wherein the first plurality of user selectable functions are distinct from the second plurality of user selectable functions; and upon selection of a selectable function icon by a user of the communications device, performing a user selectable function corresponding to the selected selectable function icon.

6. A device, comprising:

a display;

an operating environment locale detector that determines a geographic operating locale of the device:

a user operable task selector that allows a user of the device to select a present function of the device to produce a presently selected function;

a memory containing a stored historical record of selectable functions that have been selected by a user of the device and a plurality of function selection icons that correspond to a plurality of functions capable of being performed by the device; and a function processor, operably coupled to the display, the memory, the operating environment locale detector, and the user operable task selector, that selects at least a first function selection icon of the plurality of function selection icons for presentation on the display as a function of the stored historical record and the presently selected function when the device is within a first geographic operating locale, that selects at least a second function selection icon of the plurality of function selection icons for presentation on the display as a function of the stored historical record and the presently selected function when the device is within a second geographic operating locale, the second geographic operating locale being distinct from the first geographic operating locale and a function corresponding to the at least a first function selection icon being distinct from a function corresponding to the at least a second function selection icon, and that instructs the device to perform a particular function corresponding to a function selection icon selected by the user of the device.

7. A handheld communications device, comprising:

a graphic display;

a two-way wireless communication unit;

a one-way wireless remote control unit;

a user operable task selector that allows a user of the handheld communications device to select a present operation of the two-way wireless communication unit or the one-way wireless remote control unit to produce a presently selected operation;

a memory containing:

a stored historical record of:

selectable tasks: and selectable functions that correspond to the selectable tasks; which selectable functions and selectable tasks have been selected by a user of the handheld communications device; and a plurality of function selection icons that correspond to a plurality of functions capable of being performed by the handheld communications device a function processor, operably coupled to the graphic display, the memory, the operating environment locale detector, that two-way wireless communication unit, the one-way remote control unit, and the user operable task selector, that selects at least a first function selection icon of the plurality of function selection icons for presentation on the graphic display as a function of the stored historical record and the presently selected operation when the one-way remote control unit is performing the presently selected operation and the handheld communications device is within a first geographic operating locale primarily used for operating the one-way remote control unit, that selects at least a second function selection icon of the plurality of function selection icons for presentation on the display as a function of the stored historical record and the presently selected operation when the two-way wireless communication unit is performing the presently selected operation and the handheld communications the device is within a second geographic operating locale that is primarily used for operating the two-way communication unit, the second geographic operating locale being distinct from the first geographic operating locale and a function corresponding to the at least a first function selection icon being distinct from a function corresponding to the at least a second function selection icon, and that instructs the handheld communications device to perform a particular operation corresponding to a function selection icon selected by the user of the handheld communications device.

\* \* \* \* \*